Jan. 28, 1969     L. C. McMANUS     3,424,963
GENERATOR FED VARYING VOLTAGE MOTOR CONTROL SYSTEM FOR
CRANES WITH MOTOR FIELD CONTROL DURING LOWERING
Filed March 16, 1964
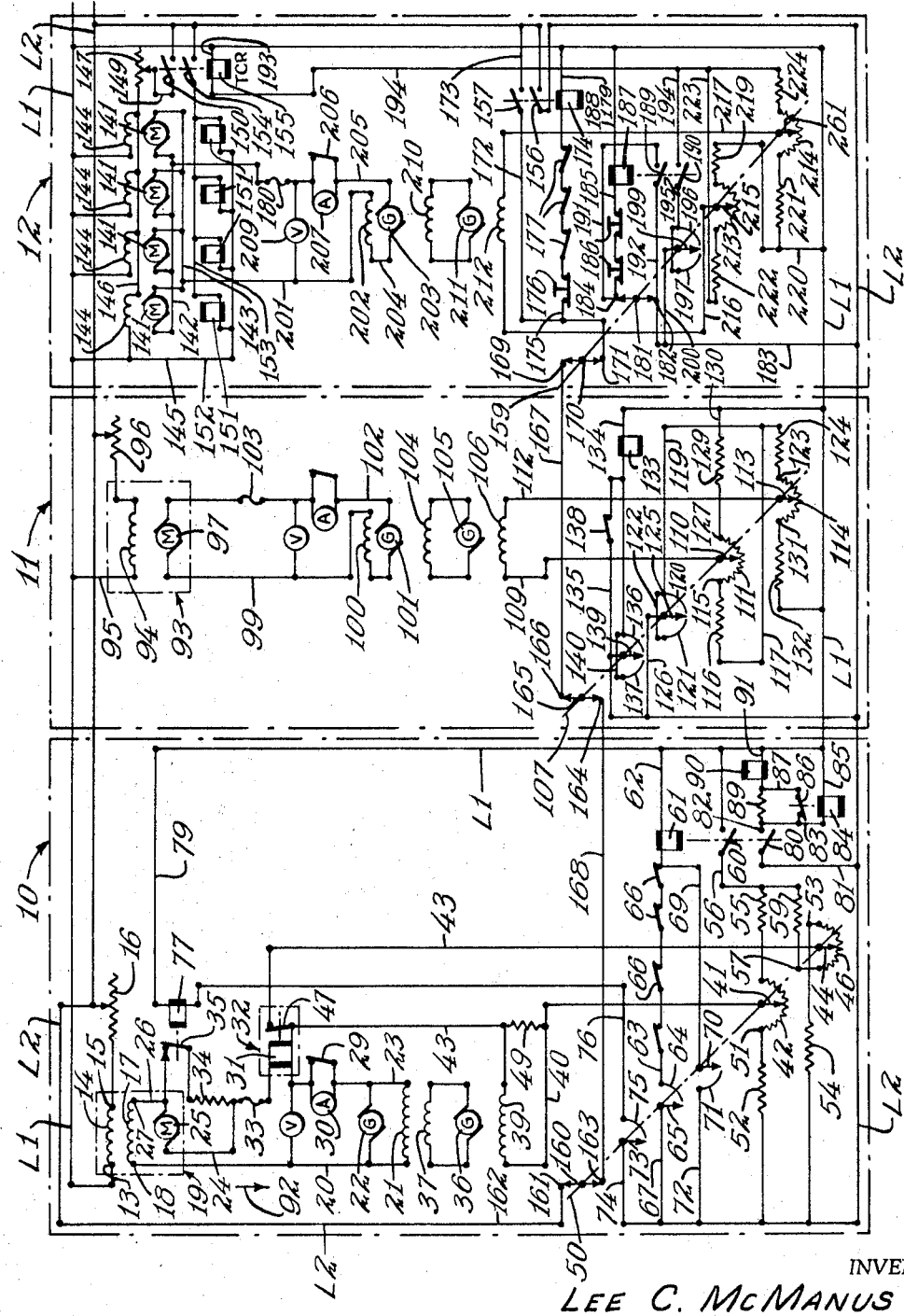
INVENTOR
LEE C. McMANUS
BY
ATTORNEY ло
United States Patent Office 3,424,963
Patented Jan. 28, 1969

3,424,963
GENERATOR FED VARYING VOLTAGE MOTOR CONTROL SYSTEM FOR CRANES WITH MOTOR FIELD CONTROL DURING LOWERING
Lee C. McManus, Duluth, Minn., assignor to Clyde Iron Works, Inc., Duluth, Minn., a corporation of Minnesota
Filed Mar. 16, 1964, Ser. No. 351,957
U.S. Cl. 318—152      6 Claims
Int. Cl. H02p 7/66

ABSTRACT OF THE DISCLOSURE

This invention resides in the provision of a hoist control system comprising a direct current compound wound motor connected in a solid loop to a shunt generator. The field of the shunt generator is connected to the armature of an exciter generator. The field current of the exciter generator is sufficiently small to be handled directly by potentiometers actuated by a master switch. The potentiometers are connected as voltage dividers driven so that at one end of travel the upper sweep is positive and at the other end of travel is negative and in a center position there is no potential difference between the sweeps. This provides a reversing center-off exciter field control resulting in a variable rate of rotation of the hoist motor. Thus the speed of hoist decreases to a constant lowering speed at full load, and increases to a faster speed at lighter loads. The speed of lowering also varies with the load weight, being slowest at full load.

---

This invention relates to an improvement in Varying Voltage Operating and Control System for Cranes and deals particularly with an apparatus capable of providing stepless, smooth control of any or all crane motions.

An object of the present invention resides in the provision of a hoist control system comprising a direct current compound wound motor of adequate horsepower to handle the load which is connected in a solid loop to a shunt generator. The field of the shunt generator is connected to the armature of an exciter generator. The field current of the exciter generator is sufficiently small to be handled directly by potentiometers actuated by the master switch. The potentiometers are connected as voltage dividers driven so that at one end of travel the upper sweep is positive and at the other end of travel is negative and in a center position there is no potential difference between the sweeps. This provides a reversing center-off exciter field control resulting in a variable rate of rotation of the hoist motor.

A feature of the present invention resides in the provision of a system of the type described in which the main generator is a conventional varying voltage loop generator. The hoist motor which is driven by the generator is a compound wound motor arranged with the series winding connected accumulative in the hoisting direction. A dynamic braking resistor and contactor is connected across the armature only of the motor. This circuit includes a contactor which opens the circuit through the resistor during the hoisting operations. The dynamic braking resistor remains in the circuit during load lowering operations to provide the desirable hoist characteristics which are obtained.

During the hoisting operation, the solenoid actuated braking contactor is energized, opening the braking circuit to provide a normal hoist. The heavier the load being hoisted, the more will be the current flowing in the loop and the motor series field and the slower will be the speed of the motor. At full load, the motor will operate at what may be defined as a full speed. When hoisting a lighter load, less current flows in the loop and series field, increasing the speed of the motor. Thus a high speed is obtained when handling a light hook load, and a stable full speed is obtained when full load is being hoisted.

A further feature of the present invention resides in the operation of the system in lowering a load. In lowering a light hook, the generator must provide down power to the motor. This current flows through the loop in a direction opposite the direction of current flow during hoisting. As a result, the motor series field is subtractive providing a weaker field and a corresponding higher speed. During the lowering operation, the dynamic braking resistor is in circuit with the motor armature, and this dynamic resistor requires power thereby increasing the field current and providing more speed. As the weight of the load being lowered increases, the load tends to overhaul the motor and at some point of load the power generated by the motor will equal the power required by the dynamic resistor and there will accordingly be no current in the loop or series field. As the weight of the load being lowered increases from this point, the motor becomes a generator, and tends to pump power back into the loop. At this point, the current in the loop opposes the generator current and the series field again becomes accumulative providing a stable full load speed. By properly balancing the series field and dynamic braking resistor, a light load high speed and full load stable speed is obtained both in the hoisting and in the lowering operations.

A further feature of the present invention lies in a means of limiting the hoisting torque to a safe value. To accomplish this result, a vibrating relay is arranged in the loop circuit with its normally closed contact shorting out a series exciter field resistor. Under excessive torque conditions, this relay will actuate to open the circuit in shunt relation to the exciter field resistor placing this resistor in the circuit. The safety of the system is further insured by an instantaneous overload relay acting to shut down the drive in the event of unforeseen high current.

A forward-reverse drive for swing, travel, bridge or trolley is obtained by using a somewhat similar control system. These systems include one or more motors, a generator, and exciter, and a control generally similar to that described. The motor or motors are straight shunt motors and when more than one is required they are connected in parallel. The generator is compound wound with the series field connected subtractive to limit loop current and by so doing creates a torque system which is very desirable for a crane. The generator shunt field is loop connected to an exciter armature. The exciter field is supplied by two master switch mounted potentiometers connected in the manner described to provide a reversing center off exciter field control.

These and other objects and novel features of the present invention will be more clearly and fully set forth in the following specification and claims.

In the drawings forming a part of the specification;
The figure illustrates a wire diagram showing the general arrangement of the control circuit.

In the particular control circuit illustrated, the crane comprises any conventional type of crane including means for raising and lowering a load, means for swinging the load in one direction or another, and means for moving the crane. For example, the crane may be of the type mounted upon spaced parallel rails for movement longitudinally of the track formed thereby, and the boom of the crane may be swung in either direction about a vertical axis and the load may be hoisted or lowered to perform its various functions.

In the drawing, the portion of the circuit enclosed by the broken line 10 indicates the hoist control. The area indicated by the numeral 11 indicates the swing control.

The area enclosed by the broken line 12 indicates the travel control. Obviously, the components of these various units may vary to some extent depending upon the particular type of crane involved. For example, in the specific arrangement disclosed, the travel control 12 is disclosed as including four drive motors as the wheel units are individually driven. This might vary where different types of cranes are involved.

With reference now to the hoist control unit 10, current is supplied by line wires identified as L–1 and L–2. As will be later described, these line wires are common to all of the units, and the current is supplied thereto from any desired source. The line wire L–1 leads to one terminal 13 of the shunt field 14, the other terminal 15 of which is connected through a variable resistance 16 to the line wire L–2 to complete the circuit.

One terminal 18 of the series field 17 of the hoist motor 19 is connected by a conductor 20 to one terminal of the shunt field 21 of the generator 22. The other terminal of the shunt generator field 21 is connected by a conductor 23 and a conductor 24 to one terminal of the armature 25 of the motor 19, the other terminal of which is connected by a conductor 26 to the remaining terminal 27 of the motor series field 17. The conductor 23 extends through 29 which is the shunt for the ammeter 30 so that the current may be measured. The conductor 23 also includes the coil 31 of an over current relay 32 which functions when the current in the circuit is excessive. The conductor 23 is also illustrated as including an overload relay 33 designed to break the UV (one of the contacts 177) circuit under overload conditions.

A dynamic braking or lowering resistor 34 is connected to the conductor 23 and leads through a normally closed relay contact switch 35 to the conductor 26 placing the dynamic braking resistor 34 in series with the motor armature 25 when the relay contact switch 35 is closed. The purpose of this arrangement will be later described.

The exciter generator 36 output feeds shunt field 37 in controlling relation with the shunt field 21 of the generator 22 and the exciter generator field coil 39 has one terminal connected by the conductor 40 to the adjustable sweep arm 41 of a potentiometer resistor 42. The other terminal of the exciter generator field coil 39 is connected by conductor 43 to the sweep arm 44 of a second potentiometer coil 46. A normally closed relay contact 47 is interposed in the conductor 43 which may be actuated by the coil 31 of the over current relay 32 previously described. The relay contact 47 opens the field to control or limit generator output field coil resistor 49 which is arranged in parallel with the field controls field discharge.

The potentionmeter arms 41 and 44 are actuated in unison with the master control switch which is indicated by the broken line 50 which diagrammatically indicates a shaft on which a number of separate switch elements are mounted. In actual practice, the master control switch comprises merely a single pivoted control lever which may be pivoted to either side of a central vertical position. However, to diagrammatically depict the structure, the numeral 50 can be considered the axis of a compound rotary switch which may be oscillated in a counterclockwise direction during hoisting operations, and oscillated in a clockwise direction from its center position during lowering operations. The potentiometer coils 42 and 46 are connected as voltage dividers and are arranged in such a manner that as the potentiometer arm 41 moves in a counterclockwise direction, the upper potentiometer sweep is positive and the same motion of the lower potentiometer arm 44 will provide a negative rating in potentiometer 46. In the center position illustrated there is no potential difference between the upper and lower sweeps 42 and 46.

As indicated, the left hand terminal 51 of the potentiometer 42 is connected to line wire L–2 through the resistor 52 while the right hand terminal 53 of the potentiometer 46 is connected to line wire L–2 through a similar resistor 54. The right hand terminal of the upper potentiometer 42 is connected through a resistor 55 and conductor 56 to the line wire L–1 while the left hand terminal 57 of the lower potentiometer 46 is connected through a resistor 59 to the conductor 56 leading to the line wire L–1. As both the potentiometer arms 41 and 44 rotate in the same direction simultaneously, one arm moves toward one end of the potentiometer coil while the other arm moves toward the opposite end thereof.

The conductor 56 includes a relay contact 60 which is normally open and which is actuated by the relay coil 61. The relay coil 61 is deenergized when the master control switch 50 is in a center position as indicated but will be energized during either the hoisting or lowering movements as will be described.

The relay coil 61 has one terminal connected by a conductor 62 to line wire L–1, the other relay coil terminal being connected by conductor 63 to a contact segment 64 of the rotary switch arm 65 forming a part of the master switch 50. The conductor 63 leads through a series of hoist limit switches 66 which are normally closed, but any of which may be opened to break the circuit to prevent injury to the equipment. The rotary switch arm 65 is connected by conductor 67 to line wire L–2. The arrangement is such that rotation of the master switch 50 in a counterclockwise direction to effect a hoisting operation will close the circuit from the switch arms 65 to the switch segment 64 to energize the relay 61 thereby closing the potentiometer circuit which controls the flow of current to the exciter generator field coil 39.

A conductor 69 is also connected to the terminal of the relay coil 61 to which the conductor 63 is connected, and leads to the rotary switch arm 70 which is engageable with a contact segment 71 connected by conductor 72 to line wire L–2. Clockwise rotation of the master switch 50 will swing the switch arm 70 into contact with the switch segment 71 thus closing the circuit through the relay coil 61 during load lowering operations and thereby causing the potentiometer circuit to be energized to control the exciter generator field coil 39.

A means is provided for opening the circuit to the dynamic brake resistor 34 during the hoisting operation. A rotary switch arm 73 is mounted upon the master switch shaft 50 and is connected to line wire L–2 by a conductor 74. An arcuate segment 75 is engaged by the rotary arm 73 as the shaft 50 is rotated in a direction to hoist the load. The segment 75 is connected by a conductor 76 to one terminal or a relay coil 77, the other terminal of which is connected by conductor 79 to line wire L–1. The relay coil 77, when energized, opens the dynamic braking contactor 35 which has been previously described. The relay coil 61 controls a second contact blade 80 which is connected by conductor 81 to line wire L–2. The normally open terminal 82 which may be closed by actuation of the contact 80 is connected by a conductor 83 to a brake control relay 84, the other terminal of which is connected by conductor 85 to line wire L–1.

The relay coil is a time opening relay which opens after a predetermined time period. When the contacts 80, 82 are closed current will flow directly to the motor brake 90, the circuit extending from L–2 through conductor 81, contact 80, conductor 83, contact 86 and conductor 87 to the brake 90, the other terminal of which is connected to L–1 through 91. The brake coil is over-voltaged for fast operation. After a predetermined time period, the relay coil 84 opens the contact 86. As a result, the current to the brake 90 must flow from L–2 through conductor 81, contact 80 and resistance 89, producing just sufficient current to hold the brake released so that the brake will set quickly when relay 61 is deenergized.

In the operation of this portion of the control system, when it is desired to hoist a load, the master switch 50 is actuated in a counterclockwise direction. This causes the switch arm 73 to engage the switch segment 75, closing the circuit from line wire L–2 through the rotary switch arm 73, and the conductor 76 to the relay coil 77, the other terminal of which is connected to line wire L-1 by conductor 79. This opens the dynamic braking contactor 35, taking the dynamic lowering resistor 34 out of the circuit of the motor armature 25. Simultaneously, the rotary switch arm 65 engages the switch segment 64, closing a circuit from line wire L-2 through this switch and through the normally closed limit switches 66 to the relay coil 61, the other terminal of which is connected to line wire L-1 by conductor 62. Energization of the relay 61 acts through relay contact 80 to close a circuit through conductors 81 and 83 to the brake relay coil 84, the other treminal of which is connected to line wire L-1 through conductor 85. As a result, the motor brake coil 90 is energized through the resistor 89 and the motor 19 is free to rotate. At the same time, the exciter generator field coil is energized through the potentiometer circuit, one potentiometer arm 41 swinging toward the positive end of the potentiometer 42 while the potentiometer arm 44 swings toward the negative end of the lower potentiometer coil 46. The shunt field 37 of the exciter generator 36 acts to cause a flow of current through the loop connecting the generator 22 and the motor 19 in the direction of the arrow 92.

Due to the fact that the hoist motor 19 is a compound wound motor with the series winding connected accumulative in the hoisting direction, the heavier the load being hoisted, the more will be the current flowing through the loop and the series field 17, causing a slower rotation of the motor. Thus at full load, the load will be hoisted at a stable full load speed. With a light load, less current will flow through the loop in the direction of the arrow 92, and a relatively high speed of travel of the load may be obtained.

In order to lower the load, the master switch 50 is rotated in a clockwise direction. During this operation, the circuit through the rotary switch arm 73 will remain broken and the relay 77 will remain deenergized, thereby maintaining the dynamic braking resistor in series with the motor armature 25. At the same time, a circuit is closed through the rotary switch 70 to the relay coil 61, releasing the brake through coil 90 and closing the potentiometer circuit controlling the exciter generator field coil current.

When a relatively light hook is being lowered, the generator must supply power to the motor 19 in a reverse direction to cause the load to lower. The flow of current through the exciter generator field coil 39 is reversed controlling the exciter generator which in turn causes a flow of current through the loop connecting the generator 22 and motor 19 in a direction opposite the direction of the arrow 92. This reverse current makes the motor series field 17 subtractive, providing a weaker field and higher motor speed. Furthermore, to supply this power to the motor armature 25, the dynamic lowering resistor 34 requires power thereby increasing the field current and providing more speed. As the load increases, the load tends to overhaul the motor until a point is reached where the motor 19 becomes a generator and pumps current back into the loop. At some predetermined point, the load which the motor generates and the power created by the motor acting as a generator will equal the power required by the dynamic lowering resistor 34 and there will be no current flowing in the loop or series field. As the load increases from this point, the current in the loop opposes the generator current and the flow of current through the loop will again be in the direction of the arrow 92. When this occurs, the series field 17 again becomes accumulative providing a stable full load lowering speed. At this point the generator becomes a dynamic braking impedance for the motor. By obtaining a proper balance between the series field 17 and the dynamic lowering resistor 34, the light load high speed and full load stable speed is obtained both in the hoisting operation and in the lowering operation.

The swing control unit 11 includes an arrangement having certain features of similarity with the hoist control unit 10. The swing motor 93 is a straight shunt motor including a field 94 one terminal of which is connected by conductor 95 to line wire L-1 and the other terminal of which is connected through a variable resistor 96 to line wire L-2. One terminal of the motor armature 97 is connected by conductor 99 through the series generator field 100 to the generator armature 101, the other terminal of which is connected by conductor 102 to the other terminal of the motor armature 97. The element 103 is the element of an overload relay which may operate to open the circuit if abnormal currents are created.

The flow of current from the generator 101 is controlled by the shunt field 104 of an exciter generator 105. The direction of current flow from the exciter generator 105 is controlled by the exciter generator field coil 106. The direction of current flow through the field coil 106 is controlled by a potentiometer system which is similar to that employed in the hoist control.

The master control 107 is diagrammatically indicated as a rotatable shaft which may swing through an angle of approximately ninety degrees on each side of a center point. One terminal of the coil 106 is connected by conductor 109 to the sweep arm 110 of a potentiometer coil 111. The other side of the exciter generator field coil 106 is connected by a conductor 112 to a similar sweep arm 113 of a second potentiometer coil 114. The arms 110 and 113 obviously rotate in unison.

The left hand terminal 115 of the potentiometer coil 111 is connected through a suitable resistance 116 to a conductor 117 and conductor 119 to the arcuate segments 120 and 121 which are connected together by the conductor 122. The right hand terminal 123 of the lower potentiometer coil 114 is connected through a suitable resistor 124 to the same conductor 119. A rotary switch arm 125 is engageable with either of the arcuate segments 120 or 121, and the arm 125 is connected to line wire L-2 by a conductor 126 thus these ends of the potentiometers are connected to line wire L-2 whenever the master switch 107 is swung either into forward or reverse position.

The right hand terminal 127 of the upper potentiometer 111 is connected through the suitable resistor 129 and conductor 130 to line wire L-1. The left terminal 131 of the lower potentiometer 114 is connected also through a suitable resistor 132 to line wire L-1. The brake coil 133 has one terminal connected by conductor 134 to line wire L-1 and has its other terminal connected by a conductor 135 to the arcuate segments 136 and 137 engageable by a rotatable switch arm 139, the segments 136 and 137 being connected as indicated at 140. The switch arm 139 is mounted on the master switch shaft 107 and insures the energization of the brake coil 133 as the master control is turned toward either a forward or reverse position.

A manually operable switch 138 is arranged in parallel to the rotary switch 139 and permits the brake to be energized when the master switch 107 is in central position.

In operation, the potentiometer circuit controls the directional flow of current through the exciter generator field 106 controlling the exciter generator. This in turn controls the main generator 101 to drive the motor 93 in one direction or another.

The travel control unit 12 is shown as including four straight shunt motors having armatures 141 connected in parallel between a pair of conductors 142 and 143. The motor armatures are provided with fields 144 having one terminal of each field connected by a conductor 145 to the line wire L-1. The other terminal of each field is connected by a conductor 146 to a variable resistor 147, the other terminal of which is connected by conductor 149 to line wire L-2 through a relay contact 150. Each of the motors are equipped with a brake indicated at 151 and one terminal of each brake coil 151 is connected by a conductor 152 to line wire L–1. The brakes 151 have their other terminals connected in parallel by a conductor 153 which extends through a relay contact 154 to line wire L–2. Thus the motors and brakes are actuated simultaneously by a relay coil 155 which is energized in a manner which will be described.

The line wire L–2 which leads to the motor control circuits is normally broken by a relay contact 156 and by a parallel relay contact 157. Each of the master control switches including the master control switch 50, the master control switch 107 of the swing control unit, and the master control switch 159 of the travel control unit include a normally closed switch which is closed only in the intermediate or neutral position of each control switch. The rotary switch arm 160 of the hoist control 50 has one terminal 161 connected to line wire L–2 by conductor 162. The other terminal 163 of the rotary switch 160 is connected to a terminal 164 of a rotary switch 165 forming a part of the master control switch 107 of the swing control. The other terminal 166 is connected by a conductor 167 to a terminal 169 of the rotary switch 170 forming a part of the travel control master switch 159. The other terminal 171 of the rotary switch 170 is connected by a conductor 172 through the normally open relay contact 157 which is connected by conductor 173 to the line wire L–2. Thus it is evident that all of the master control circuits are connected in series so that the control may only be set into operation when all of the master control switches are in a neutral position.

The relay coil 174 which closes the contacts 156 and 157 is connected in a conductor 175 leading through an emergency stop switch 176 and a series of overload switches 177 to conductor 172. The other terminal of the relay coil 174 is connected to line wire L–1 by conductor 179. The overload switches 177 are actually controlled by the current control element 33 in the hoist unit 10, the current control element 103 in the swing control unit 11, and a similar current control element 180 in the travel control unit 12 which will be described. When any of the switches 176 and 177 are open, line wire L–2 is broken through the contacts 156 and 157 and the circuit will not again be energized until all of the master control switches are returned to a neutral position.

The master control switch 159 controls a second normally closed switch 181 having one terminal 182 connected to line wire L–2 by a conductor 183. The other terminal 184 of the switch 181 leads through a conductor 185 including a pair of normally closed push buttons 186 to a relay coil 187, the other terminal of which is connected by conductor 188 to line wire L–1. The relay 187 operates a pair of contacts 189 and 190. The switch terminal 184 is connected by a conductor 191 to a terminal of the relay contact 189, the other of which is connected by conductor 192 to the switch terminal 182. Thus when the relay coil 187 is energized, a holding circuit is provided in shunt relation with the normally closed switch 181.

The relay 155 which controls the circuit to the motors and brakes has one terminal connected by conductor 193 to line wire L–1 and the other relay terminal is connected by conductor 194 to one terminal of the relay switch contact 190, the other terminal of which is connected by conductor 195 to a pair of arcuate segments 196 and 197 engageable with a rotary switch arm 199. The switch arm 199 is connected by a conductor 200 to conductor 183 leading to line wire L–2. The rotary switch arm 199 thus closes a circuit to the relay 155 each time the master control switch 159 is moved to either side of a neutral center position, acting upon movement of the master control switch to energize the motors including the armatures 141 and releasing the brakes 151. While the brakes 151 as well as the previously described brakes are illustrated merely as electrical coils, in usual practice these coils are the solenoid coils of air valves which actuate the brakes. Obviously, other types of brakes could be similarly actuated.

A motor control loop includes a conductor 201 connected to the conductor 143 and to the series field 202 of the generator 203. The other terminal of the field coil 202 is connected by conductor 204 to one terminal of the generator armature, the other terminal of which is connected by a conductor 205 to the other motor conductor 142. The conductor 205 leads through 206 which is the shunt for the ammeter 207, and leads through the overload control element 180 which functions as described to open one of the normally closed switches 177 in the event excessive current develops due to an overload of the unit. A volt meter 209 is also connected between opposite sides of the loop between the motors and the generator as shown in the various other controls but not described.

The direction of rotation of the motors is determined by the control field 210 connected to opposite terminals of the exciter generator 211. The direction of current flow from the exciter generator 211 is determined by the shunt field 212 connected to a pair of potentiometers 213 and 214 controlled by the master switch 159. The potentiometers 213 and 214 are connected as voltage dividers as in the previous control circuits. The sweep arm 215 of the potentiometer 213 is connected by conductor 216 to one terminal of the exciter generator field coil 212, while the sweep hand 261 of the potentiometer 214 is connected by a conductor 217 to the other terminal of the exciter generator field 212. The right hand side of the potentiometer 213 is connected through a resistor 219 to a conductor 220 leading to line wire L–1. The left hand side of the lower potentiometer 214 is similarly connected through a resistor 221 and a portion of the conductor 220 to line wire L–1.

The left hand terminal of the upper potentiometer 213 is connected through a resistor 222 and a conductor 223 to the conductor 194 leading through the rotary switch 199 to line wire L–2 through conductors 200 and 183 when the master switch is not in neutral position. The right hand side of potentiometer 214 is similarly connected through a resistor 224 to the conductor 194. Accordingly, as the master control switch is rotated in one direction from its neutral position, the current will flow through the exciter generator field coil 212 in a direction to cause forward movement of the motors while movement of the master control switch 159 in the opposite direction will cause a reverse flow of current in the field coil 212 and cause a reverse rotation of the motor armatures 141.

The control of the apparatus is believed clear from the foregoing description. When all of the master controls are in a neutral position, the current from line wire L–1 will flow through conductor 162 and the various normally closed master control switches 160, 165, and 170 to the relay 174 energizing this relay. Energization of the relay 174 establishes a current flow to all of the control units by closing relay contact 156 which otherwise breaks line wire L–2 to the control circuits. Energization of relay 174 also establishes a holding circuit for the relay 174 through conductor 173, contact 157, conductors 172 and 175 to the relay coil 174, the other terminal of which is connected to line wire L–1 through conductor 179. It will be noted that the relay 174 may be deenergized at any time by the emergency stop switch 176 or by any of the current overload switches 177.

The operation of the hoist control unit 10 is effected through the master switch 50. When the switch is actuated in a direction to hoist the load, the normally closed switch 160 is opened, breaking the circuit through the conductor 162 from the line wire L–2 to the relay coil 174. However, this circuit is maintained through the relay contact 157, the circuit extending from line wire L–2 through conductor 173, contact 157, conductor 172, and conductor 175 to the relay coil 174, the other side of which is connected to line wire L–1 through conductor 179.

During this operation, the relay 77 is actuated to break the circuit including the dynamic breaking resistor 34. Current flows through the loop connecting the generator 22 and the motor armature 25 in a direction to hoist the load. The speed of lifting movement depends upon the weight of the load. If the load is light in weight, the speed of lift is high, while at full load the load is lifted with a stable full speed. During either of the hoisting or lowering movements the relay 61 is actuated, closing circuits to the potentiometers 42 and 46. These potentiometers change the current and direction of flow of the exciter generator series field controlling the direction of rotation of the motor armature 25.

Also during this operation, the relay 61 closes a circuit to the motor brake solenoid 90 and the time opening relay 84. When the brake is first energized, current flows directly to the brake causing a fast operation thereof. After a predetermined time period, the time opening relay 82 opens so that the flow of current must pass through the resistor 89. When the current to the brake is open, as occurs when the master switch is moved to neutral position, the circuit to the brake is opened, and the brake stops the rotating motor armature 25.

During the lowering operation, the circuit through the dynamic braking resistor 34 remains intact and in this direction of rotation the motor series field is subtractive. Thus when lowering a light load, the motor will travel at a higher speed. The speed is also increased by the presence of the resistor 34. However, as the weight of the load increases, the load tends to overhaul the motor until a point is reached where the motor becomes a generator and pumps power back into the loop. At some point of load, the power generated by the motor will equal the power required by the dynamic resistor 34 and there will be no current in the loop or series field. If the load is increased beyond this point, the series field will again become accumulative, providing a stable full load speed. Thus in both lifting and lowering the load, a stable full speed will be attained if a full load is being handled, but the hook will move at a greater rate of speed when the load is light.

In order to swing the crane in one direction or the other, the swing control unit 11 is operated. If the master control 107 is rotated in one direction, the voltage divider system will function to cause rotation of the motor armature 97 in one direction while if the master control is moved in the opposite direction from a central neutral position, the motor will operate in a reverse direction. The rotary switch 139 keeps the motor brake solenoid 133 energized while the motor is rotating in either direction, while the rotary switch 125 maintains the circuit to the potentiometers at all times except when the master control is in its neutral position.

The travel control unit 12 functions in a somewhat similar manner. The rotary switch 181 functions to close the circuit to the relay 187 when the master control 159 is in a neutral position, and the relay contact 189 provides a holding circuit for maintaining this relay energized when the switch 181 is broken. The manually operable switches 186 are designed for operation at remote points so that persons other than the operator may stop the movement of the crane if a dangerous situation is encountered.

The rotary switch 199 controls the circuit to the potentiometers which, in turn, determine the direction of flow of current from the generator 203 to the motor armatures 141. The switch 199 also controls the circuit to the relay 155 which closes the shunt field circuits of the motors and controls the operation of the motor brakes.

In accordance with the patent statutes, I have described the principles of construction and operation of my improvement in "Varying Voltage Operating and Control System for Cranes," and while I have endeavored to set forth the best embodiment thereof, I desire to have it understood that changes may be made within the scope of the following claims without departing from the spirit of my invention.

I claim:
1. A crane control system including:
   a direct current reversible compound wound hoist motor,
   a varying voltage loop generator,
   a motor shunt winding connected to a source of direct current,
   a motor armature,
   a motor series field winding having one end connected to one terminal of said armature and with the series winding accumulative in the hoisting direction of the motor, and either subtractive or accumulative in the lowering direction of the motor,
   a solid loop permanently connecting said motor to said generator, the loop extending from said one motor armature terminal through said generator armature and to the other motor armature terminal, whereby said generator may act as a dynamic braking impedance for said motor,
   a generator field winding in shunt relation with said generator armature,
   a dynamic lowering resistor and a switch connected in series external of said solid loop between said motor armature terminals only,
   means opening said switch to disconnect the lowering resistor when said motor armature is rotating in a hoist direction, said lowering resistor otherwise remaining in circuit, and
   means controlling the direction of flow of current through said loop from said generator armature to said motor armature, said current flowing in one direction when said motor armature is rotating in a hoist direction; and flowing in the opposite direction to initiate rotation of said motor armature in a lowering direction,
   said lowering resistor increasing the field current and tending to increase speed of the motor in a lowering direction under light load conditions,
   said motor functioning as a generator upon an increase in load reversing the direction of flow of current in said loop automatically making the series field accumulative and reducing the load lowering speed.

2. The structure of claim 1 and including an exciter generator connected to a second generator field winding associated with the first named generator shunt winding, and means controlling the direction of flow of current through said second generator field winding.

3. A crane control system including:
   a direct current reversible compound wound hoist motor,
   a varying voltage loop generator,
   a motor shunt field winding connected to a source of direct current,
   a motor armature,
   a motor series field winding having one end connected to one terminal of said armature and with the series winding accumulative in the hoisting direction of the motor and subtractive or accumulative in the direction of the motor depending upon the load being lowered,
   a solid loop permanently connecting said motor to said generator, the loop extending from said one motor armature terminal through said generator armature and to said other motor armature terminal, whereby the generator may act as a dynamic braking impedance, for the motor,
   a dynamic lowering resistor and a switch connected in series between said motor armature terminals only,
   means for opening said switch when said motor armature is rotating in a hoist direction,
   means controlling the flow of current in said loop to flow in one direction when said motor armature is rotating in a hoist direction, and for initiating the flow of current in a reverse direction to lower a load, the load, if sufficiently heavy, causing the direction of flow of current in said loops to return to said one direction.

4. The structure of claim 3 and in which said controlling means includes:
a pair of potentiometers each secured between a positive and a negative potential as a voltage divider,
potentiometer arms forming a part of said potentiometers and connected for movement in unison, the arm of one potentiometer moving toward positive potential, while the others move toward negative potential, and
an exciter generator control field winding having one end connected to one said potentiometer arm while the other moves toward negative potential,
whereby manual operation of said potentiometer arms will control the direction of flow of current in said loop connecting said motor and generator armatures.

5. A crane control system including:
a direct current reversible compound wound hoist motor,
a varying voltage loop generator,
a motor shunt field winding connected to a source of direct current,
a motor armature,
a motor series field winding having one end connected to one terminal of said armature or accumulative and with the series winding accumulative in the hoisting direction of the motor, and subtractive in the lowering direction of the motor,
a solid loop permanently connecting said motor to said generator, the loop extending from said one motor armature terminal through said motor series winding to one terminal of said generator armature and from the other generator armature terminal to the other motor armature terminal whereby said generator may act as a dynamic braking impedance for said motor,
a generator field winding in shunt relation with said generator armature,
a dynamic lowering resistor and switch connected in series externally of said solid loop between said motor armature terminals only,
a manually operable master control switch movable from a central neutral position to either a hoist position or a lower position,
control means operable by said master control switch and connected to said generator field winding to control the direction of flow of current through said loop between said motor armature and generator armature,
means actuated by movement of said master control switch to a hoist position to open said switch in series with said dynamic braking resistor,
whereby during a hoisting operation the speed of rotation of said motor armature will be varied in proportion to the load being hoisted, and
rotation of said motor armature in the direction to lower the load causing the motor series field to be subtractive with light loads, increasing the motor speed and whereby,
when the load is increased the motor acts as a generator to pump current into the loop until when the power created by the motor exceeds the power required by the dynamic lowering resistor, the flow of current through the loop will reverse direction, and become accumulative and provide a more stable speed.

6. The structure of claim 5 and in which the control means includes a pair of potentiometers connected as voltage dividers between positive and negative potentials, and including potentiometer arms rotatable in unison, one moving toward positive potential as the other moves toward negative potential, and
an exciter generator connected to the field winding of the first named generator and having an exciter field winding connected at one end to one potentiometer arm and connected at the other end to the other potentiometer arm.

References Cited

UNITED STATES PATENTS

| | | | |
|---|---|---|---|
| 945,103 | 1/1910 | Lord | 318—158 |
| 1,048,548 | 12/1912 | Kramer | 318—158 |
| 1,850,772 | 3/1932 | Raube | 318—158 |
| 2,605,454 | 7/1952 | Grepe | 318—380 |
| 2,624,029 | 12/1952 | Lillguist | 318—158 |
| 2,962,644 | 11/1960 | Johnson | 318—158 |

ORIS L. RADER, *Primary Examiner.*

T. E. LYNCH, *Assistant Examiner.*

U.S. Cl. X.R.

318—381